(12) United States Patent
Shirao

(10) Patent No.: US 9,163,386 B2
(45) Date of Patent: Oct. 20, 2015

(54) WORK VEHICLE AND WORK VEHICLE CONTROL METHOD

(75) Inventor: Atsushi Shirao, Komatsu (JP)

(73) Assignee: KOMATSU LTD., Tokyo (JP)

( * ) Notice: Subject to any disclaimer, the term of this patent is extended or adjusted under 35 U.S.C. 154(b) by 68 days.

(21) Appl. No.: 13/808,755

(22) PCT Filed: May 9, 2012

(86) PCT No.: PCT/JP2012/061877
§ 371 (c)(1),
(2), (4) Date: Jan. 7, 2013

(87) PCT Pub. No.: WO2013/145336
PCT Pub. Date: Oct. 3, 2013

(65) Prior Publication Data
US 2014/0200775 A1 Jul. 17, 2014

(30) Foreign Application Priority Data

Mar. 30, 2012 (JP) ................................. 2012-078939

(51) Int. Cl.
*E02F 9/22* (2006.01)
*B60W 10/06* (2006.01)
(Continued)

(52) U.S. Cl.
CPC .............. *E02F 9/2246* (2013.01); *B60K 28/165* (2013.01); *B60W 10/06* (2013.01); *B60W 10/103* (2013.01); *B60W 30/18172* (2013.01);
(Continued)

(58) Field of Classification Search
CPC ..... B60K 28/16; B60K 28/165; E02F 9/2246; B60W 10/103; B60W 30/18172; B60W 10/06; B60W 2510/0638; B60W 2710/0644; B60W 2710/105; B60W 2540/10; F16H 61/421; F16H 61/472
See application file for complete search history.

(56) References Cited

U.S. PATENT DOCUMENTS 8,244,445 B2 * 8/2012 Luehrsen et al. ............... 701/82
8,286,748 B2 * 10/2012 Takahashi et al. ............ 180/307
(Continued)

FOREIGN PATENT DOCUMENTS

EP 2 009 329 A1 12/2008
JP 2008-180274 A 8/2008
(Continued)

OTHER PUBLICATIONS

The extended European search report for the corresponding European application No. 12780628.9, issued on Feb. 11, 2014.

*Primary Examiner* — John Q Nguyen
*Assistant Examiner* — Michael Kerrigan
(74) *Attorney, Agent, or Firm* — Global IP Counselors, LLP

(57) ABSTRACT

A work vehicle is provided with an engine, a hydraulic pump, a movement hydraulic motor, an acceleration operation member, and a control section. The hydraulic pump is driven by the engine. The movement hydraulic motor is driven by hydraulic fluid which is discharged from the hydraulic pump. The acceleration operation member is operated in order to set a target rotation speed for the engine. The control section is configured to perform traction control where the maximum traction force is reduced by limiting the displacement of the movement hydraulic motor to an upper limit displacement which is smaller than the maximum displacement. The control section increases the upper limit displacement of the movement hydraulic motor according to an increase in the operation amount of the acceleration operation member or the engine rotation speed in the traction control.

3 Claims, 10 Drawing Sheets

(51) Int. Cl.
  *B60W 30/18*    (2012.01)
  *F16H 61/421*   (2010.01)
  *F16H 61/472*   (2010.01)
  *B60K 28/16*    (2006.01)
  *B60W 10/103*   (2012.01)

(52) U.S. Cl.
  CPC ............ *F16H61/421* (2013.01); *F16H 61/472* (2013.01); *B60W 2510/0638* (2013.01); *B60W 2540/10* (2013.01); *B60W 2710/0644* (2013.01); *B60W 2710/105* (2013.01)

(56) References Cited

U.S. PATENT DOCUMENTS

2004/0211614 A1    10/2004  Matsuyama
2010/0009806 A1    1/2010   Shirao et al.

FOREIGN PATENT DOCUMENTS

JP    2008-275012 A       11/2008
JP    2011-52793 A        3/2011
WO    WO 2008/136204 A1   11/2008

\* cited by examiner

WORK VEHICLE AND WORK VEHICLE CONTROL METHOD

CROSS-REFERENCE TO RELATED APPLICATIONS

This application claims priority to Japanese Patent Application No. 2012-078939 filed on Mar. 30, 2012, the disclosure of which is hereby incorporated herein by reference in its entirety.

TECHNICAL FIELD

The present invention relates to a work vehicle and a work vehicle control method.

BACKGROUND ART

Typically, a so-called HST (Hydro Static Transmission) is mounted in a work vehicle such as a wheel loader. An HST type of work vehicle drives a hydraulic pump using an engine and drives a movement hydraulic motor using hydraulic fluid which is discharged from the hydraulic pump. Due to this, the work vehicle moves. In such an HST type of work vehicle, it is possible to control vehicle speed and traction force by controlling the rotation speed of the engine, the displacement of the hydraulic pump, the displacement of the movement hydraulic motor, and the like (refer to Japan Patent Laid-open Patent Publication JP-A-2008-275012).

In the work vehicle, it is possible for an operator to select execution of traction control. The traction control is control where maximum traction force is reduced by the displacement of the movement hydraulic motor being limited to an upper limit displacement which is smaller than the maximum displacement. FIG. 10 shows an example of motor displacement and drive circuit pressure characteristics which regulate the drive circuit pressure and the displacement of the movement hydraulic motor. For example, when the upper limit displacement of the movement hydraulic motor is set as Ma, the maximum traction force is reduced more than a state where the traction control is not performed. In addition, when the upper limit displacement is set as Mb, the maximum traction force is further reduced.

On the other hand, the displacement of the hydraulic pump is controlled in the work vehicle based on pump displacement and drive circuit pressure characteristics as shown in FIG. 11. L11 to L16 in the diagram are lines which indicate the pump displacement and drive circuit pressure characteristics which change according to the engine rotation speed. The drive circuit pressure is fluid pressure of the hydraulic fluid which is sent from the hydraulic pump to the movement hydraulic motor. The pump displacement and drive circuit pressure characteristics change from L11 to L16 as the engine rotation speed increases. In addition, as shown by L12, the pump displacement is reduced as the drive circuit pressure increases and the pump displacement increases when the drive circuit pressure is reduced. A cut off valve is provided in the work vehicle so as to protect the movement hydraulic circuit. The cut off valve reduces the drive circuit pressure so that a predetermined cut off pressure value is not exceeded. As a result, as shown in L14 in FIG. 11, the cut of valve is activated in a case where the pump displacement is a predetermined pump displacement value Qx or less, the drive circuit pressure is reduced and becomes constant at a cut off pressure value Px.

SUMMARY

The drive circuit pressure increases in the work vehicle according to an increase in the engine rotation speed in a range where the engine rotation speed is from a low speed to an intermediate speed. However, the drive circuit pressure is substantially constant at the cut off pressure irrespective of an increase in the engine rotation speed in a range where the engine rotation speed is from an intermediate speed to a high speed. For example, as shown in FIG. 12, the drive circuit pressure increases according to an increase in the engine rotation speed when the engine rotation speed is in a range from zero to N3. In FIG. 12, the engine rotation speeds N1, N2, and N3 respectively correspond to the engine rotation speeds with the pump displacement and drive circuit pressure characteristics L11, L12, and L13 shown in FIG. 11. In addition, in FIG. 12, engine rotation speeds N4, N5, and N6 respectively correspond to the engine rotation speeds with the pump displacement and drive circuit pressure characteristics L14, L15, and L16 shown in FIG. 11. As shown in FIG. 12, the drive circuit pressure is constant at the cut off value Px irrespective of an increase in the engine rotation speed when the engine rotation speed is N4 or more.

As described above, when the traction control is executed in a state where the drive circuit pressure is at the cut off pressure value Px, the displacement of the movement hydraulic motor is constant at the upper limit displacement which has been set. Accordingly, the drive circuit pressure and the displacement of the movement hydraulic pressure are substantially constant and do not increase even if the engine rotation speed increases. As a result, the traction force is substantially constant and does not increase even when the operator operates the acceleration operation member and the engine rotation speed increases in a range where the engine rotation speed is an intermediate speed or higher. Accordingly, the operation of the acceleration operation member and the actual change in traction force do not match and movement operability is reduced.

An object of the present invention is to provide a work vehicle and a work vehicle control method where it is possible to improve movement operability.

A work vehicle according to a first aspect of the present invention is provided with an engine, a hydraulic pump, a movement hydraulic motor, an acceleration operation member, and a control section. The hydraulic pump is driven by the engine. The movement hydraulic motor is driven by hydraulic fluid which is discharged from the hydraulic pump. The acceleration operation member is operated in order to set a target rotation speed for the engine. The control section is configured to perform traction control where the maximum traction force is reduced by limiting the displacement of the movement hydraulic motor to an upper limit displacement which is smaller than the maximum displacement. The control section increases the upper limit displacement of the movement hydraulic motor according to an increase in the operation amount of the acceleration operation member or the engine rotation speed in the traction control.

A work vehicle according to a second aspect of the present invention is the work vehicle according to the first aspect wherein the control section increases the upper limit displacement of the movement hydraulic motor according to an increase in the operation amount of the acceleration operation member or the engine rotation speed when the operation amount of the acceleration operation member or the engine rotation speed is a predetermined threshold or more.

A work vehicle according to a third aspect of the present invention is the work vehicle according to the second aspect wherein the control section sets the upper limit displacement of the movement hydraulic motor to a constant value irrespective of the operation amount of the acceleration operation member or the engine rotation speed when the operation amount of the acceleration operation member or the engine rotation speed is smaller than the predetermined threshold.

A work vehicle according to a fourth aspect of the present invention is the work vehicle according to any of the first to the third aspects wherein the displacement of the movement hydraulic motor is controlled by controlling an inclination angle of the movement hydraulic motor.

A work vehicle control method according to a fifth aspect of the present invention is a control method of a work vehicle which is provided with an engine, a hydraulic pump, a movement hydraulic motor, and an acceleration operation member. The hydraulic pump is driven by the engine. The movement hydraulic motor is driven by hydraulic fluid which is discharged from the hydraulic pump. The acceleration operation member is operated in order to set a target rotation speed for the engine. The work vehicle control method according to the present invention includes performing traction control where the maximum traction force is reduced by limiting the displacement of the movement hydraulic motor to an upper limit displacement which is smaller than the maximum displacement, and increasing the upper limit displacement of the movement hydraulic motor according to an increase in the operation amount of the acceleration operation member or the engine rotation speed in the traction control.

In the work vehicle according to the first aspect of the present invention, the upper limit displacement of the movement hydraulic motor is increased according to an increase in the operation amount of the acceleration operation member or the engine rotation speed in the traction control. As a result, it is possible to increase the traction force according to the operation of the acceleration operation member. Due to this, it is possible to improve movement operability.

In the work vehicle according to the second aspect of the present invention, an increase in the upper limit displacement of the movement hydraulic motor is performed when the operation amount of the acceleration operation member or the engine rotation speed is the predetermined threshold or more. As a result, it is possible to suppress a feeling of unease in that the traction force not increasing when the operator has considerably operated the acceleration operation member to a certain extent. Due to this, it is possible to improve movement operability.

In the work vehicle according to the third aspect of the present invention, an increase in the upper limit displacement of the movement hydraulic motor is not performed when the operation amount of the acceleration operation member or the engine rotation speed is smaller than the predetermined threshold. Due to this, it is possible to suppress unnecessary increases in the traction force in the traction control.

In the work vehicle according to the fourth aspect of the present invention, it is possible to set the upper limit displacement of the movement hydraulic motor by controlling the inclination angle of the movement hydraulic motor.

In the work vehicle control method according to the fifth aspect of the present invention, the upper limit displacement of the movement hydraulic motor is increased according to an increase in the operation amount of the acceleration operation member or the engine rotation speed in the traction control. As a result, it is possible to increase the traction force according to the operation of the acceleration operation member. Due to this, it is possible to improve movement operability.

DESCRIPTION OF EMBODIMENTS

Figure 1:
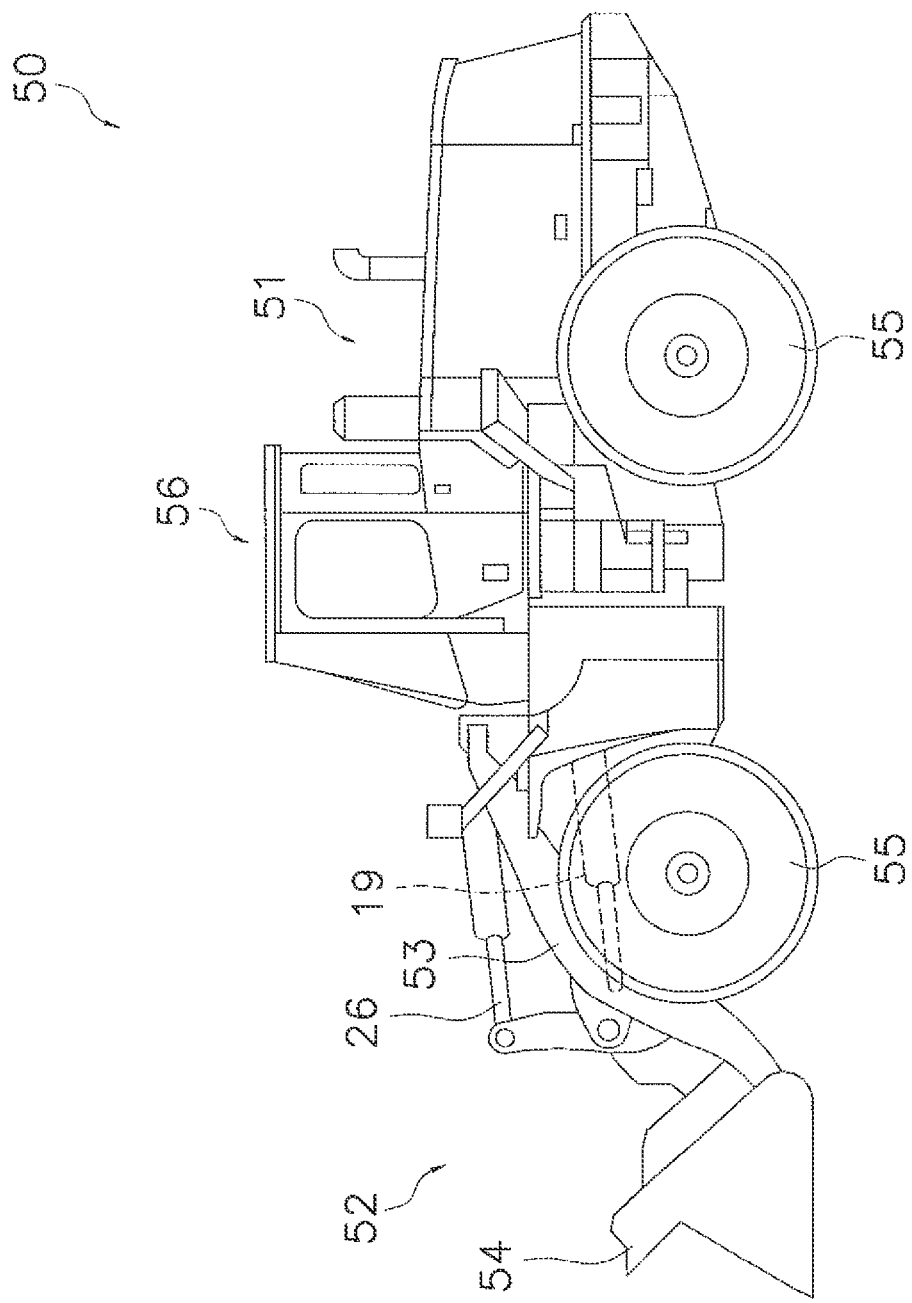
FIG. 1 is a side view diagram illustrating a configuration of a work vehicle according to an embodiment of the present invention.

Below, a work vehicle 50 according to an embodiment of the present invention will be described using the diagrams. FIG. 1 is a side view diagram of the work vehicle 50. The work vehicle 50 is a wheel loader. The work vehicle 50 is provided with a vehicle body 51, a working implement 52, a plurality of tires 55, and a cab 56. The working implement 52 is attached to a front portion of the vehicle body 51. The working implement 52 has a boom 53, a bucket 54, a lift cylinder 19, and a bucket cylinder 26. The boom 53 is a member for lifting the bucket 54. The boom 53 is driven using the lift cylinder 19. The bucket 54 is attached to a tip edge of the boom 53. The bucket 54 carries out dumping and tilting using the bucket cylinder 26. The cab 56 is mounted on the vehicle body 51.

Figure 2:
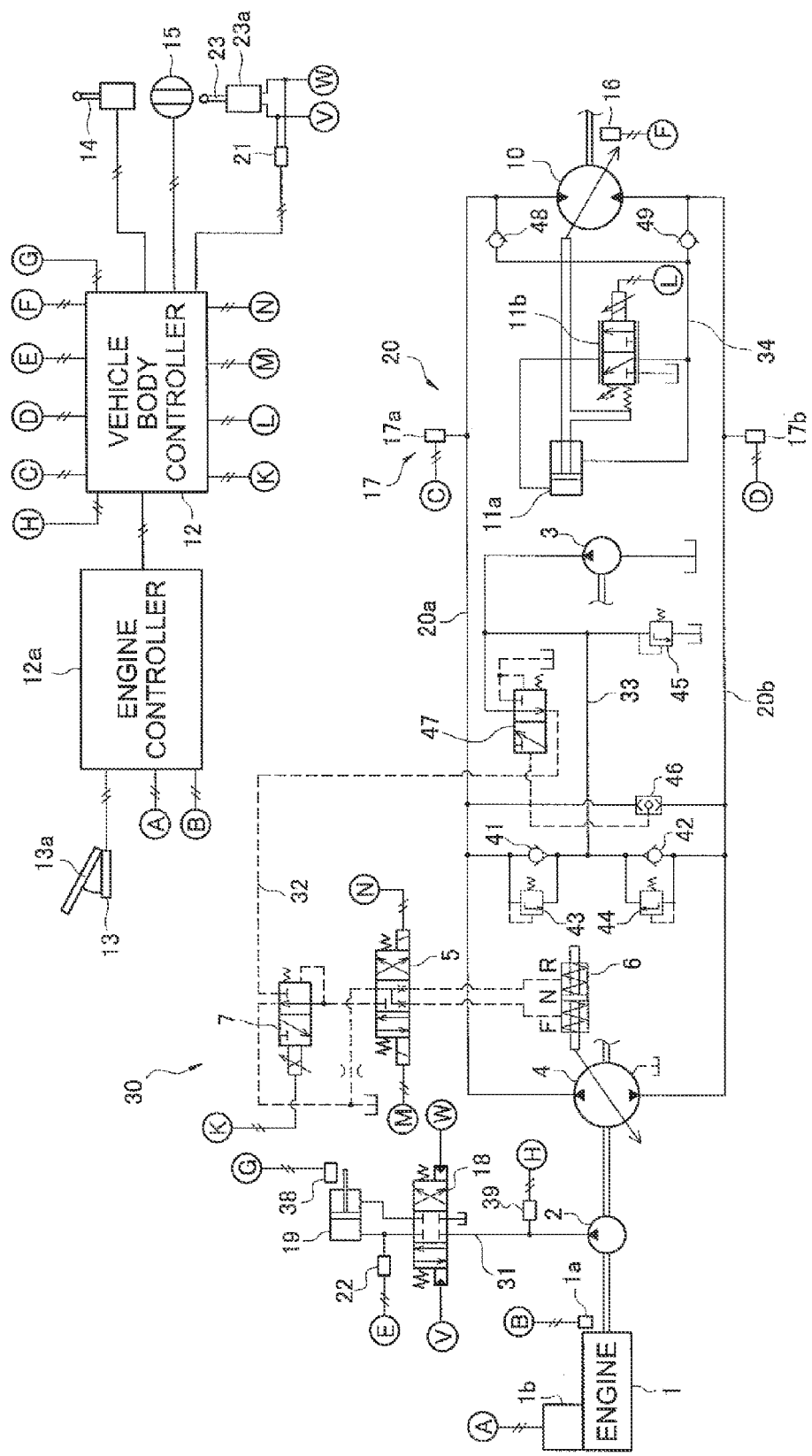
FIG. 2 is a hydraulic circuit diagram illustrating an HST system which is mounted in the work vehicle according to the embodiment of the present invention.

FIG. 2 is a block diagram illustrating a configuration of a hydraulic driving mechanism 30 which is mounted in the work vehicle 50. The hydraulic driving mechanism 30 mainly has an engine 1, a second hydraulic pump 2, a charge pump 3, a first hydraulic pump 4, a movement hydraulic motor 10, an engine controller 12a, a vehicle body controller 12, and a drive hydraulic circuit 20. In the hydraulic driving mechanism 30, hydraulic fluid is discharged due to the first hydraulic pump 4 being driven by the engine 1. The movement hydraulic motor 10 is driven using the hydraulic fluid which is discharged from the first hydraulic pump 4. Then, the work vehicle 50 moves due to the movement hydraulic motor 10 rotationally driving the tires 55 described above. That is, a so-called HST system with one pump and one motor is adopted in the hydraulic driving mechanism 30.

The engine 1 is a diesel engine and the output torque which is generated by the engine 1 is transmitted to the second hydraulic pump 2, the charge pump 3, the first hydraulic pump 4, and the like. An engine rotation speed sensor 1a which detects the actual rotation speed of the engine 1 is provided in the hydraulic driving mechanism 30. In addition, a fuel injection device 1b is connected to the engine 1. The engine controller 12a which will be described later controls the output torque (referred to below as "engine torque") and the rotation speed of the engine 1 by controlling the fuel injection device 1b according to a target engine rotation speed which has been set.

The first hydraulic pump 4 discharges the hydraulic fluid due to being driven by the engine 1. The first hydraulic pump 4 is a variable displacement type of hydraulic pump. The hydraulic fluid which is discharged from the first hydraulic pump 4 is sent to the movement hydraulic motor 10 by being passed through the drive hydraulic circuit 20. Specifically, the drive hydraulic circuit 20 has a first drive circuit 20a and a second drive circuit 20b. The movement hydraulic motor 10 is driven in one direction (for example, a forward direction) by the hydraulic fluid being supplied to the movement hydraulic motor 10 from the first hydraulic pump 4 via the first drive circuit 20a. The movement hydraulic motor 10 is driven in another direction (for example, a reverse direction) by the hydraulic fluid being supplied to the movement hydraulic motor 10 from the first hydraulic pump 4 via the second drive circuit 20b.

A drive circuit pressure detection section 17 is provided in the drive hydraulic circuit 20. The drive circuit pressure detection section 17 detects the pressure of the hydraulic fluid (referred to below as "drive circuit pressure") which is supplied to the movement hydraulic motor 10 via the first drive circuit 20a or the second drive circuit 20b. Specifically, the drive circuit pressure detection section 17 has a first drive circuit pressure sensor 17a and a second drive circuit pressure sensor 17b. The first drive circuit pressure sensor 17a detects the fluid pressure of the first drive circuit 20a. The second drive circuit pressure sensor 17b detects the fluid pressure of the second drive circuit 20b. The first drive circuit pressure sensor 17a and the second drive circuit pressure sensor 17b send detection signals to the vehicle body controller 12. In addition, an FR switching section 5 and a pump displacement control cylinder 6 for controlling the discharge direction of the first hydraulic pump 4 are connected in the first hydraulic pump 4.

The FR switching section 5 is an electromagnetic control valve which switches the supply direction of the hydraulic fluid to the pump displacement control cylinder 6 based on a control signal from the vehicle body controller 12. The FR switching section 5 switches the discharge direction of the first hydraulic pump 4 by switching the supply direction of the hydraulic fluid to the pump displacement control cylinder 6. Specifically, the FR switching section 5 switches the discharge direction of the first hydraulic pump 4 between discharging to the first drive circuit 20a and discharging to the second drive circuit 20b. The pump displacement control cylinder 6 is driven due to the hydraulic fluid being supplied via a pump pilot circuit 32 and changes the inclination angle of the first hydraulic pump 4.

A pump displacement control section 7 is arranged in the pump pilot circuit 32. The pump displacement control section 7 connects the pump displacement control cylinder 6 to either the pump pilot circuit 32 or a hydraulic fluid tank. The pump displacement control section 7 is an electromagnetic control valve which is controlled based on a control signal from the vehicle body controller 12. The pump displacement control section 7 adjusts the inclination angle of the first hydraulic pump 4 by controlling the pressure of the hydraulic fluid in the pump displacement control cylinder 6.

The pump pilot circuit 32 is connected to a charge circuit 33 and the hydraulic fluid tank via a cut off valve 47. A pilot port of the cut off valve 47 is connected to the first drive circuit 20a and the second drive circuit 20b via a shuttle valve 46. The shuttle valve 46 introduces the larger out of the fluid pressure of the first drive circuit 20a and the fluid pressure of the second drive circuit 20b into the pilot port of the cut off valve 47. Due to this, the drive circuit pressure is applied to the pilot port of the cut off valve 47. The cut off valve 47 links the charge circuit 33 and the pump pilot circuit 32 when the drive circuit pressure is lower than a predetermined cut off pressure. Due to this, the hydraulic fluid is supplied from the charge circuit 33 to the pump pilot circuit 32. When the drive circuit pressure is the predetermined cut off pressure or more, the cut off valve 47 links the pump pilot circuit 32 to the hydraulic fluid tank and the hydraulic fluid in the pump pilot circuit 32 escapes into the hydraulic fluid tank. Due to this, the displacement of the first hydraulic pump 4 is reduced and an increase in the drive circuit pressure is suppressed due to the fluid pressure in the pump pilot circuit 32 being reduced.

The charge pump 3 is driven by the engine 1 and is a pump for supplying the hydraulic fluid to the drive hydraulic circuit 20. The charge pump 3 is connected to the charge circuit 33. The charge pump 3 supplies the hydraulic fluid to the pump pilot circuit 32 via the charge circuit 33. The charge circuit 33 is connected to the first drive circuit 20a via a first check valve 41. The first check valve 41 permits flow of the hydraulic fluid from the charge circuit 33 to the first drive circuit 20a, but restricts flow of the hydraulic fluid from the first drive circuit 20a to the charge circuit 33. In addition, the charge circuit 33 is connected to the second drive circuit 20b via a second check valve 42. The second check valve 42 permits flow of the hydraulic fluid from the charge circuit 33 to the second drive circuit 20b, but restricts flow of the hydraulic fluid from the second drive circuit 20b to the charge circuit 33. In addition, the charge circuit 33 is connected to the first drive circuit 20a via a first relief valve 43. The first relief valve 43 is open when the fluid pressure of the first drive circuit 20a is larger than a predetermined pressure. The charge circuit 33 is connected to the second drive circuit 20b via a second relief valve 44. The second relief valve 44 is open when the fluid pressure of the second drive circuit 20b is larger than a predetermined pressure. In addition, the charge circuit 33 is connected to the hydraulic fluid tank via a low-pressure relief valve 45. The low-pressure relief valve 45 is opened when the fluid pressure of the charge circuit 33 is larger than a predetermined relief pressure. Due to this, the drive circuit pressure is adjusted so that the predetermined relief pressure is not exceeded. In addition, the predetermined relief pressure of the low-pressure relief valve 45 is very low compared to the relief pressure of the first relief valve 43 and the relief pressure of the second relief valve 44. Accordingly, the hydraulic fluid is supplied from the charge circuit 33 to the drive hydraulic circuit 20 via the first check valve 41 or the second check valve 42 when the drive circuit pressure is lower than the fluid pressure of the charge circuit 33.

The second hydraulic pump 2 is driven by the engine 1. The hydraulic fluid which is discharged from the second hydraulic pump 2 is supplied to the lift cylinder 19 via a working implement hydraulic circuit 31. Due to this, the working implement 52 is driven. In addition, the hydraulic fluid which is discharged from the second hydraulic pump 2 is supplied to a steering cylinder (not shown) via the working implement hydraulic circuit 31. Due to this, the direction of the work vehicle 50 is changed. The discharge pressure of the second hydraulic pump 2 is detected by a discharge pressure sensor 39. The discharge pressure sensor 39 sends a detection signal to the vehicle body controller 12. A working implement control valve 18 is provided in the working implement hydraulic circuit 31. The working implement control valve 18 is driven according to the operation amount of a working implement operation member 23. The working implement control valve 18 controls the flow rate of the hydraulic fluid which is supplied to the lift cylinder 19 according to pilot pressure which is applied to the pilot port. The pilot pressure which is applied to the pilot port of the working implement control valve 18 is controlled using a pilot valve 23a of the working implement operation member 23. The pilot valve 23a applies the pilot pressure to the pilot port of the working implement operation valve 18 according to the operation amount of the working implement operation member 23. Due to this, the lift cylinder 19 is controlled according to the operation amount of the working implement operation member 23. The pilot pressure which is applied to the pilot port of the working implement control valve 18 is detected by a PCC pressure sensor 21. In addition, the pressure of the hydraulic fluid which is supplied to the lift cylinder 19 is detected by a boom pressure sensor 22. The PPC pressure sensor 21 and the boom pressure sensor 22 send detection signals to the vehicle body controller 12. In addition, a boom angle detection section 38 is provided in the lift cylinder 19. The boom angle detection section 38 detects the boom angle which will be described later. The boom angle detection section 38 is a sensor which detects the rotation angle of the boom 53. Alternatively, the boom angle detection section 38 may detect the stroke amount of the lift cylinder 19 and the rotation angle of the boom 53 may be calculated from the stroke amount. The boom angle detection section 38 sends a detection signal to the vehicle body controller 12. Here, the bucket cylinder 26 is also controlled using a control valve in the same manner as the lift cylinder 19, but the diagrammatical representation thereof is omitted in FIG. 2.

The movement hydraulic motor 10 is a variable displacement type of hydraulic motor. The movement hydraulic motor 10 is driven using the hydraulic fluid which is discharged from the first hydraulic pump 4 and a driving force for movement is generated. A motor cylinder 11a and a motor displacement control section 11b are provided in the movement hydraulic motor 10. The motor cylinder 11a changes the inclination angle of the movement hydraulic motor 10. The motor displacement control section 11b is an electromagnetic control valve which is controlled based on a control signal from the vehicle body controller 12. The motor displacement control section 11b controls the motor cylinder 11a based on the control signal from the vehicle body controller 12. The motor cylinder 11a and the motor displacement control section 11b are connected to a motor pilot circuit 34. The motor pilot circuit 34 is connected to the first drive circuit 20a via a check valve 48. The check valve 48 permits flow of the hydraulic fluid from the first drive circuit 20a to the motor pilot circuit 34, but restricts flow of the hydraulic fluid from the motor pilot circuit 34 to the first drive circuit 20a. The motor pilot circuit 34 is connected to the second drive circuit 20b via a check valve 49. The check valve 49 permits flow of the hydraulic fluid from the second drive circuit 20b to the motor pilot circuit 34, but restricts flow of the hydraulic fluid from the motor pilot circuit 34 to the second drive circuit 20b. The fluid pressure which is the larger out of the first drive circuit 20a and the second drive circuit 20b, that is, the hydraulic fluid of the drive circuit pressure, is supplied to the motor pilot circuit 34 using the check valves 48 and 49. The motor displacement control section 11b switches the supply direction and the supply flow rate of the hydraulic fluid from the motor pilot circuit 34 to the motor cylinder 11a based on the control signal from the vehicle body controller 12. Due to this, it is possible for the vehicle body controller 12 to arbitrarily change the displacement of the movement hydraulic motor 10. In addition, it is possible to arbitrarily set the maximum displacement and the minimum displacement of the movement hydraulic motor 10.

A vehicle speed sensor 16 is provided in the hydraulic driving mechanism 30. The vehicle speed sensor 16 detects vehicle speed. The vehicle speed sensor 16 sends a detection signal to the vehicle body controller 12. The vehicle speed sensor 16 detects the vehicle speed by, for example, detecting the rotation speed of the tire driving shaft.

The work vehicle 50 is provided with an acceleration operation member 13a, a forward and reverse switching operation member 14, and a traction control selection member 15.

The acceleration operation member 13a is a member for the operator to set the target engine rotation speed. The acceleration operation member 13a is, for example, an acceleration pedal and is operated by the operator. The acceleration operation member 13a is connected to an acceleration operation amount sensor 13. The acceleration operation amount sensor 13 is configured by a potentiometer or the like. The acceleration operation amount sensor 13 sends an opening signal which indicates the operation amount of the acceleration operation member 13a (referred to below as "acceleration operation amount") to the engine controller 12a. It is possible for the operator to control the rotation speed of the engine 1 by adjusting the acceleration operation amount.

The forward and reverse switching operation member 14 is operated by the operator and is switched to a forward position, a reverse position, and a neutral position. The forward and reverse switching operation member 14 sends an operation signal which indicates the position of the forward and reverse switching operation member 14 to the vehicle body controller 12. It is possible for the operator to switch between forward and reverse of the work vehicle 50 by operating the forward and reverse switching operation member 14.

The traction control selection member 15 is, for example, a switch. The traction control selection member 15 is operated by the operator and is a member for selecting the execution of the traction control which will be described later. The traction control is control which reduces the maximum traction force more than a state where the traction control is not being performed (referred to below as "normal state"). It is possible for the operator to reduce the maximum traction force by the execution of the traction control being selected using the traction control selection member 15. The traction control selection member 15 sends an operation signal which indicates the selection position of the traction control selection member 15 to the vehicle body controller 12.

Figure 3:
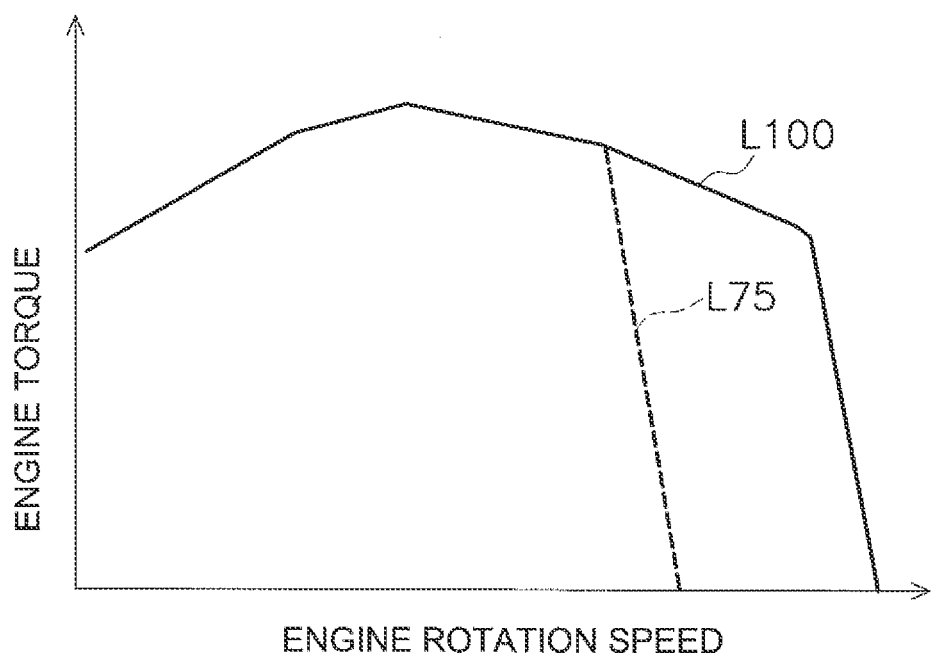
FIG. 3 is a diagram illustrating an example of an output torque curve of an engine.

The engine controller 12a is an electronic control section which has a computation device such as a CPU, various types of memory, and the like. The engine controller 12a controls the engine 1 so that the target rotation speed which has been set is obtained. Output torque curves of the engine 1 are shown in FIG. 3. The output torque curves of the engine 1 show the relationship between the rotation speeds of the engine 1 and the size of the maximum engine torque which is able to be output by the engine 1 in each of the rotation speeds. In FIG. 3, the solid line L100 shows an engine output torque curve when the acceleration operation amount is 100%. This engine output torque curve is equivalent to, for example, a rating of the engine 1 or the maximum power output. Here, an acceleration operation amount of 100% has the meaning of a state where the acceleration operation member 13a is being operated to the maximum. In addition, the dashed line L75 shows an engine output torque curve when the acceleration operation amount is 75%. The engine controller 12a controls the output of the engine 1 so that the engine torque is the engine output torque curve or less. The control of the engine 1 is, for example, performed by controlling the upper value of the fuel injection amount to the engine 1.

The vehicle body controller 12 is an electronic control section which has a computation device such as a CPU, various types of memory, and the like. The vehicle body controller 12 is an example of the control section of the present invention. The vehicle body controller 12 controls the displacement of the first hydraulic pump 4 and the displacement of the movement hydraulic motor 10 by each control valve being electronically controlled based on output signals from each detection section.

Figure 4:
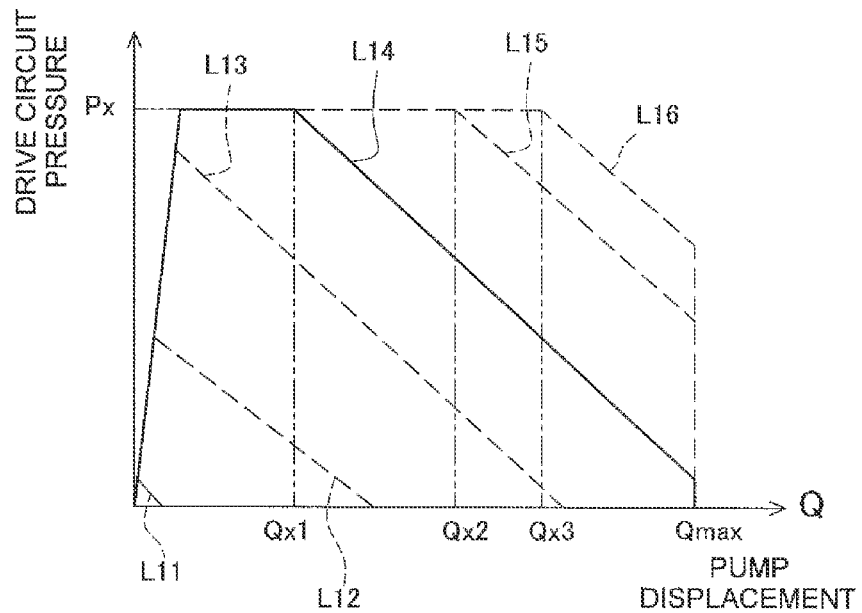
FIG. 4 is a diagram illustrating an example of pump displacement and drive circuit pressure characteristics.

Specifically, the vehicle body controller 12 outputs an instruction signal to the pump displacement control section 7 based on the engine rotation speed which is detected by the engine rotation speed sensor 1a. Due to this, the relationship between the pump displacement and the drive circuit pressure is regulated. An example of pump displacement and drive circuit pressure characteristics is shown in FIG. 4. The pump displacement and drive circuit pressure characteristics show the relationship of the pump displacement and the drive circuit pressure. L11 to L16 in the diagram are lines which indicate the pump displacement and drive circuit pressure characteristics which change according to the engine rotation speed. Specifically, the pump displacement and drive circuit pressure characteristics are changed in L11 to L16 due to the flow rate of the pump displacement control section 7 being controlled by the vehicle body controller 12 based on the engine rotation speed. Due to this, the pump displacement is controlled to correspond to the engine rotation speed and the drive circuit pressure. The pump displacement and drive circuit pressure characteristics change from L11 to L16 as the engine rotation speed increases. In addition, as shown in L11 to L13, the pump displacement is reduced as the drive circuit pressure increases and the pump displacement increases as the drive circuit pressure is reduced. In the pump displacement and drive circuit pressure characteristics shown in L14, the drive circuit pressure is constant at the cut off pressure value Px described above due to the action of the cut off valve 47 in a case where the pump displacement is a predetermined pump displacement value Qx1 or less. In the pump displacement and drive circuit pressure characteristics shown in L15, the drive circuit pressure is constant at the cut off pressure value Px described above due to the action of the cut off valve 47 in a case where the pump displacement is a predetermined pump displacement value Qx2 or less. In the pump displacement and drive circuit pressure characteristics shown in L16, the drive circuit pressure is constant at the cut off pressure value Px described above due to the action of the cut off valve 47 in a case where the pump displacement is a predetermined pump displacement value Qx3 or less. Qx1<Qx2<Qx3. That is, the pump displacement, when the drive circuit pressure is constant at the cut off pressure value Px, increases according to an increase in the engine rotation speed.

Figure 5:
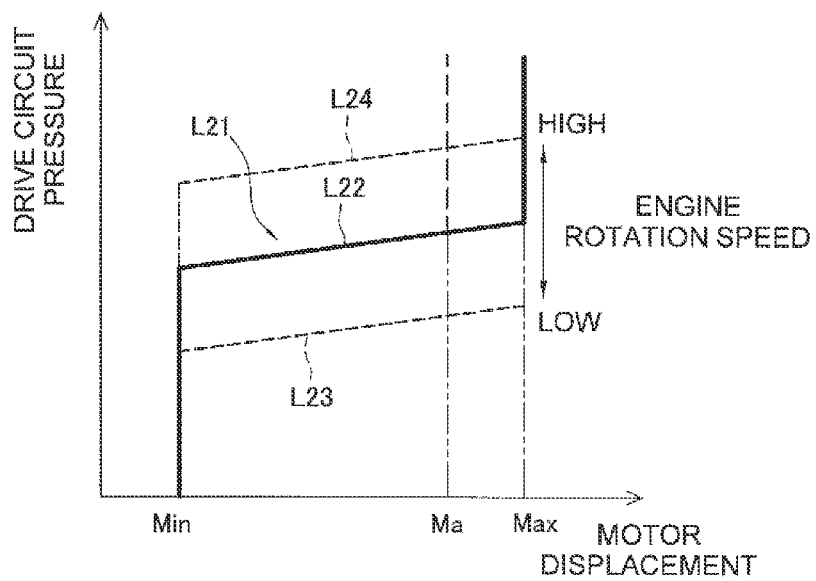
FIG. 5 is a diagram illustrating an example of motor displacement and drive circuit pressure characteristics.
Figure 6:
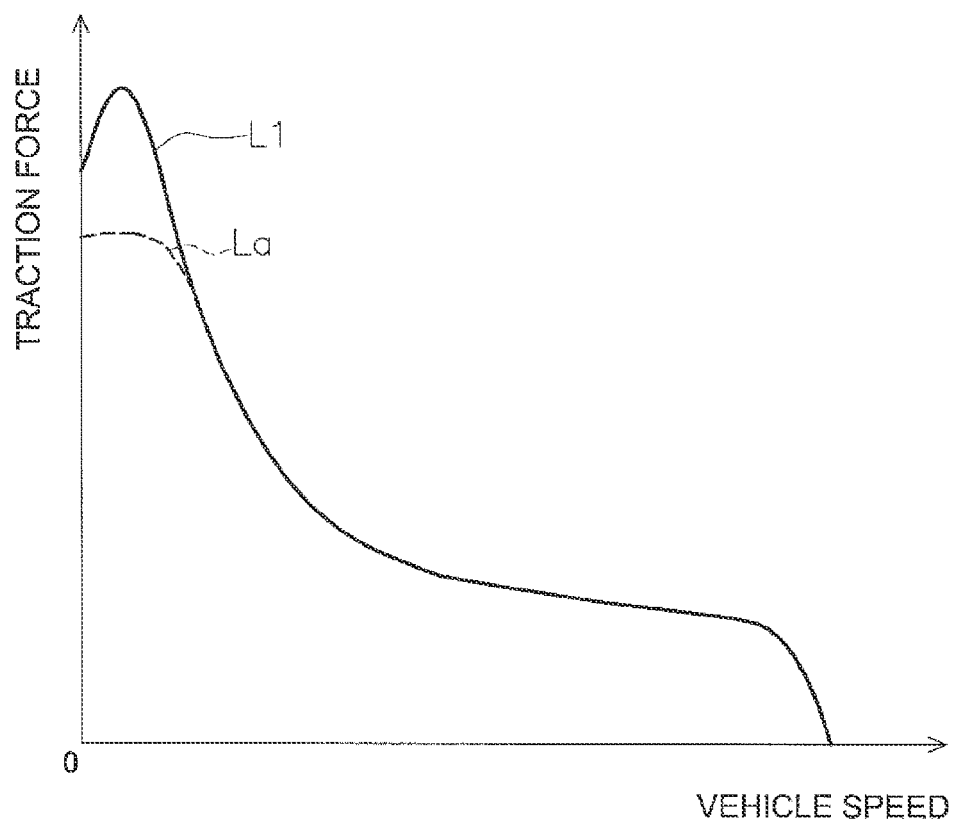
FIG. 6 is a diagram illustrating an example of vehicle speed and traction force characteristics of the work vehicle.

The vehicle body controller 12 processes the output signals from the engine rotation speed sensor 1a and the drive circuit pressure detection section 17 and outputs the instruction signal of the motor displacement to the motor displacement control section 11b. Here, the vehicle body controller 12 references the motor displacement and drive circuit pressure characteristics which are stored in the vehicle body controller 12 and sets the motor displacement from the value of the engine rotation speed and the value of the drive circuit pressure. The vehicle body controller 12 outputs a change instruction for the inclination angle, which corresponds to the motor displacement which has been set, to the motor displacement control section 11b. An example of motor displacement and drive circuit pressure characteristics is shown in FIG. 5. The solid line L21 in the diagram is a line where the motor displacement has been set with regard to the drive circuit pressure in a state where the engine rotation speed is a certain value. The motor displacement in this case corresponds to the inclination angle of the movement hydraulic motor 10. The inclination angle is a minimum (Min) until a case where the drive circuit pressure is a certain value or less. After this, the inclination angle also gradually becomes larger in accompaniment with an increase in the drive circuit pressure (the inclined portion L22 of the solid line). Then, after the inclination angle becomes a maximum (Max), the inclination angle is maintained at the maximum inclination angle Max even if the drive circuit pressure increases. The inclined portion L22 regulates the target pressure of the drive circuit pressure. That is, the vehicle body controller 12 increases the displacement of the movement hydraulic motor when the drive circuit pressure is larger than the target pressure. In addition, the displacement of the movement hydraulic motor is reduced when the drive circuit pressure is smaller than the target pressure. The target pressure is smaller than the cut off pressure value Px described above. In addition, the target pressure is set according to the engine rotation speed. That is, the inclined portion L22 shown in FIG. 5 is set so as to rise and fall according to increases and decreases in the engine rotation speed. Specifically, with regard to the inclined portion L22, the inclination angle becomes larger from a state where the drive circuit pressure is lower if the engine rotation speed is low and is controlled so as to reach the maximum inclination angle in a state where the drive circuit pressure is lower (refer to the inclined portion L23 of the dashed line at the lower side in FIG. 5). Conversely, the inclination angle is maintained at the minimum inclination angle Min until the drive circuit pressure is higher if the engine rotation speed is high and is controlled so as to reach the maximum inclination angle Max in a state where the drive circuit pressure is higher (refer to the inclined portion L24 of the dashed line at the upper side in FIG. 5). Due to this, as shown by L1 in FIG. 6, it is possible for the work vehicle to automatically change speed without an operation to change speed from a vehicle speed of zero to the maximum vehicle speed by the traction force and the vehicle speed being changed in a stepless manner. Here, FIG. 6 is a vehicle speed and traction force characteristics diagram when the acceleration operation amount is at the maximum. In addition, the inclined portion L22 in FIG. 5 is shown with the inclination being emphasized for simplicity of understanding and is actually substantially horizontal in practice. Accordingly, when the drive circuit pressure reaches the target pressure, the motor displacement is switched between a minimum value (or a minimum control value) and a maximum value (or maximum control value). However, the instruction value is not changed immediately when the drive circuit pressure reaches the target pressure and a time delay is generated. The time delay is a reason why the inclined portion L22 exists.

The vehicle body controller 12 executes the traction control by the traction control selection member 15 being operated. The traction control is a control where the maximum traction force of the vehicle is reduced more than the maximum traction force in a normal state by the displacement of the movement hydraulic motor 10 being limited to the upper limit displacement which is smaller than the maximum displacement in the normal state. The vehicle body controller 12 reduces the upper limit displacement of the movement hydraulic motor 10 according to an operation of the traction control selection member 15. The vehicle body controller 12 increases the upper limit displacement of the movement hydraulic motor 10 according to an increase in the acceleration operation amount when the acceleration operation amount is a predetermined threshold or more. In addition, the vehicle body controller 12 sets the upper limit displacement of the movement hydraulic motor to a constant value irrespective of the acceleration operation amount when the acceleration operation amount is smaller than the predetermined threshold. As shown in FIG. 5, the vehicle body controller 12 changes the upper limit displacement from Max to Ma when the traction control is selected using the traction control selection member 15 and the acceleration operation amount is smaller than the predetermined threshold. The vehicle body controller 12 outputs an instruction signal to the motor displacement control section 11b. When the upper limit displacement is set at Ma, the vehicle speed and traction force characteristics change in the same manner as the line La in FIG. 6. Due to this, the maximum traction force is reduced compared to the line L1 which shows the vehicle speed and traction force characteristics at the normal state.

Figure 7:
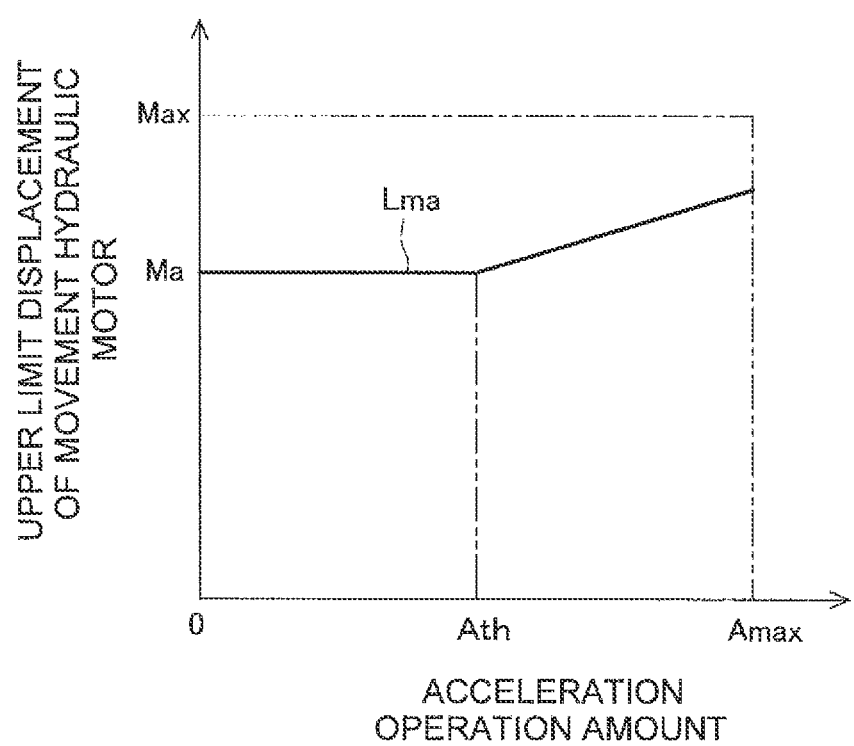
FIG. 7 is a diagram illustrating an example of upper limit displacement information.

The vehicle body controller 12 determines the upper limit displacement of the movement hydraulic motor 10 with the traction control described above based on upper limit displacement information Lma as shown in FIG. 7. The upper limit displacement information Lma regulates the upper limit displacement of the movement hydraulic motor 10 with regard to the acceleration operation amount. As shown in FIG. 7, in the upper limit displacement information Lma, the upper limit displacement of the movement hydraulic motor 10 is constant at Ma irrespective of the acceleration operation amount when the acceleration operation amount is smaller than a predetermined threshold Ath. The upper limit displacement of the movement hydraulic motor 10 increases according to an increase in the acceleration operation amount when the acceleration operation amount is the predetermined threshold Ath or more. For example, when the maximum operation amount is 100%, the predetermined threshold Ath may be 50%.

Figure 8:
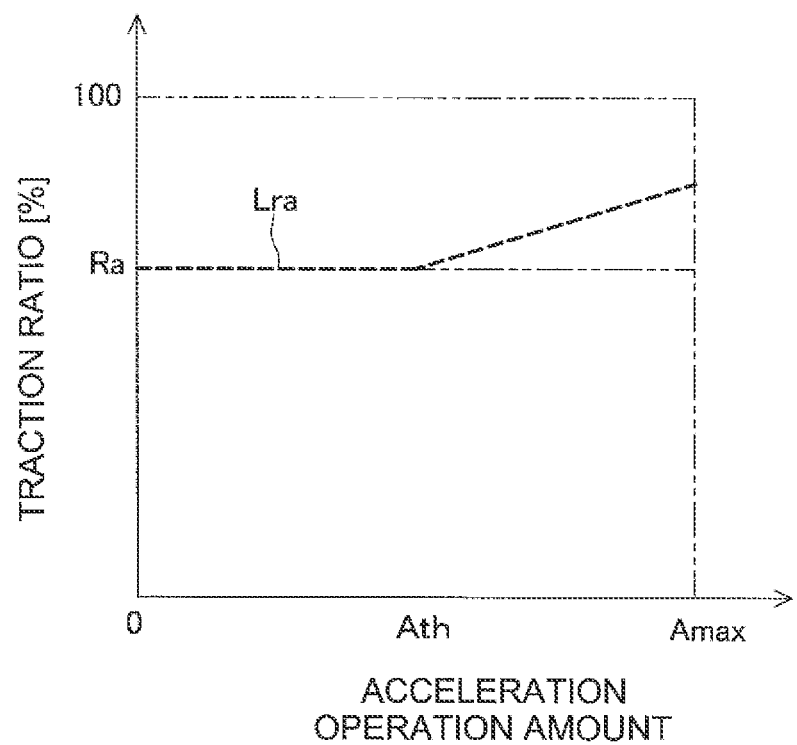
FIG. 8 is a diagram illustrating an example of traction ratio information.

FIG. 8 shows traction ratio information Lra which regulates the relationship between a traction ratio and the acceleration operation amount. The traction ratio indicates a ratio of the maximum traction force with the traction control when the maximum traction force in the normal state is 100%. That is, the upper limit displacement information Lma described above is set so that the relationship of the traction ratio and the acceleration operation amount which is indicated in the traction ratio information Lra is realized. In the traction ratio information Lra, the traction ratio is constant at Ra when the acceleration operation amount is smaller than the predetermined threshold Ath. The traction ratio increases according to the acceleration operation amount when the acceleration operation amount is larger than the predetermined threshold Ath. However, the traction ratio is smaller than 100% when the acceleration operation amount is at the maximum operation amount Amax.

As above, in the work vehicle 50 according to the embodiment, the upper limit displacement of the movement hydraulic motor 10 increases according to an increase of the acceleration operation amount in the traction control. Specifically, the upper limit displacement of the movement hydraulic motor 10 is not fixed at Ma as in the related art when the execution of the traction control is selected and changes to a value which is larger than Ma according to the acceleration operation amount. Accordingly, it is possible to increase the traction force according to the operation of the acceleration operation member 15. Due to this, it is possible to improve movement operability.

Figure 9:
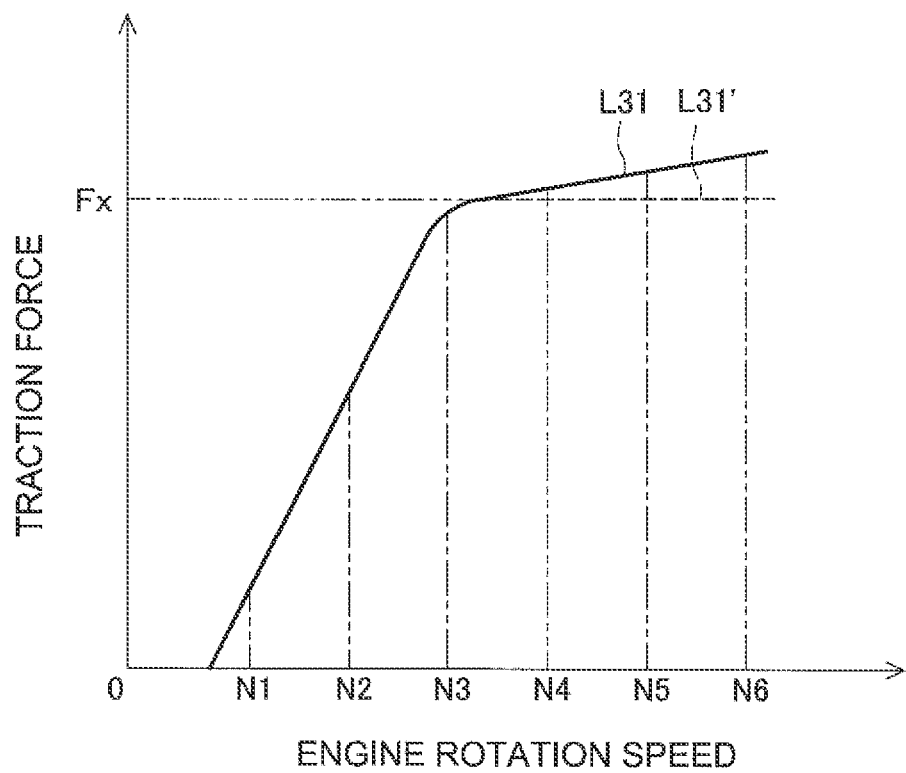
FIG. 9 is a diagram illustrating a relationship between traction force and engine rotation speed when execution of traction control is selected.
Figure 10:
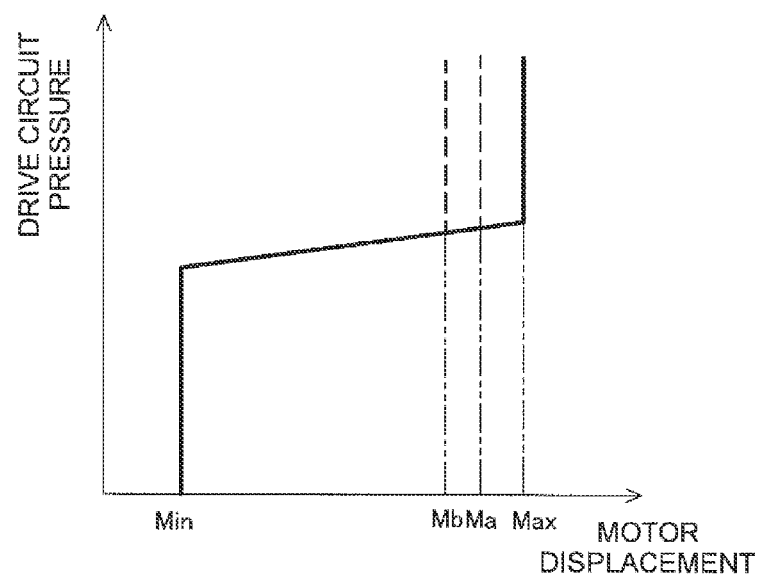
FIG. 10 is a diagram illustrating an example of motor displacement and drive circuit pressure characteristics in the related art.
Figure 11:
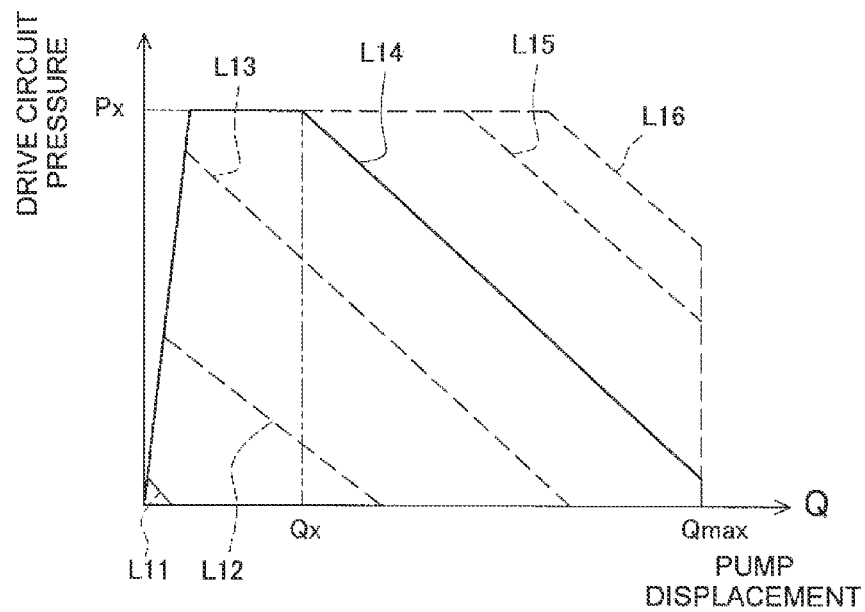
FIG. 11 is a diagram illustrating an example of pump displacement and drive circuit pressure characteristics in the related art.
Figure 12:
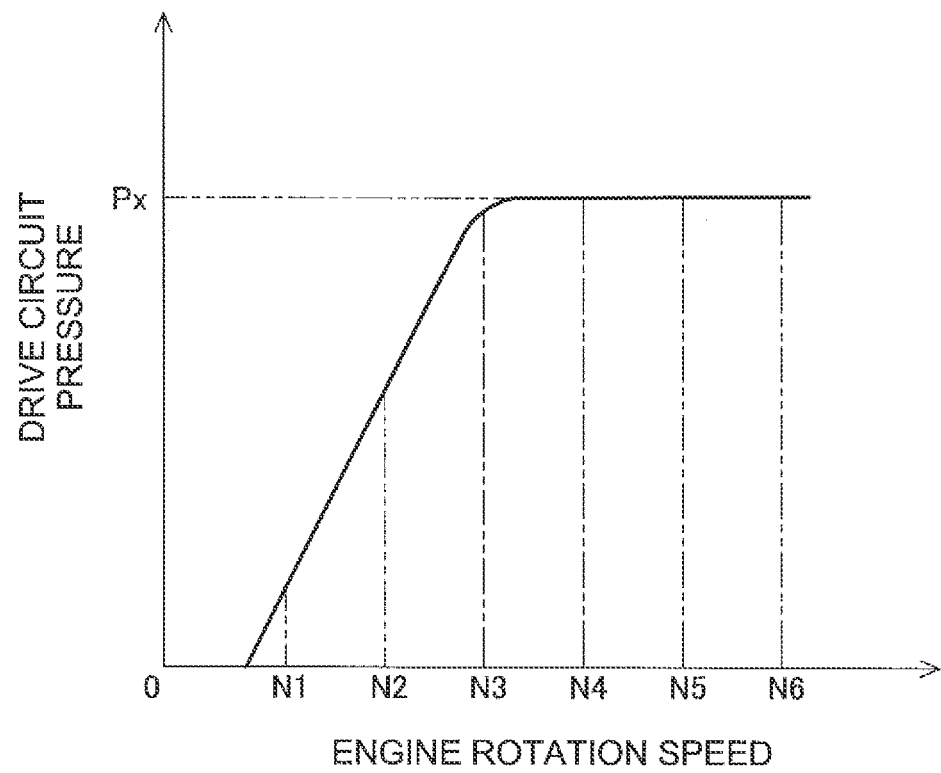
FIG. 12 is a diagram illustrating a relationship between engine rotation speed and drive circuit pressure in the related art.

FIG. 9 shows a relationship between the traction force and the engine rotation speed when the execution of the traction control is selected. In FIG. 9, engine rotation speeds N1 to N6 respectively correspond to engine rotation speeds with the pump displacement and drive circuit pressure characteristics L11 to L16 shown in FIG. 4. For example, the pump displacement and drive circuit pressure characteristics are L1 when the engine rotation speed is N1. In addition, the pump displacement and drive circuit pressure characteristics are L14 when the engine rotation speed is N4. The solid line L31 in FIG. 9 shows a relationship of the traction force and the engine rotation speed of the work vehicle 50 according to the embodiment. The dashed line L31' shows a relationship of the traction force and the engine rotation speed of a work vehicle according to a comparative example. In the work vehicle according to the comparative example, the upper limit displacement of the movement hydraulic motor 10 is set to be constant at Ma (refer to FIG. 5) irrespective of the acceleration operation amount when the execution of the traction control is selected. As a result, the traction force is constant at Fx and the traction force hardly increases even if the engine rotation speed increases in a state where the engine rotation speed is N4 or more. On the other hand, in the work vehicle 50 according to the embodiment, the traction force increases according to an increase in the engine rotation speed even if the engine rotation speed is N4 or more as shown by L31. In this manner, in the work vehicle 50 according to the embodiment, it is possible to improve movement operability since it is possible to increase the traction force according to the operation of the acceleration operation member 15.

Above, an embodiment of the present invention has been described but the present invention is not limited to the embodiment described above and various modifications are possible in the range which does not depart from the gist of the invention.

In the embodiment, a wheel loader is described as an example as a work vehicle where the present invention is applied. However, the present invention is not limited to this. For example, it is possible for the present invention to be applied with regard to other work vehicles where an HST is mounted.

In the embodiment, the work vehicle 50, where an HST system with one pump and one motor including one hydraulic pump and movement hydraulic motor 10 is mounted, is described as an example. However, the present invention is not limited to this. For example, the present invention may be applied with regard to a work vehicle where an HST system with one pump and two motors including one hydraulic pump and two movement hydraulic motor is mounted.

The traction control may have a plurality of control modes. It is possible to reduce the traction force in a stepped manner in each control mode. Alternatively, the traction control may reduce the traction force to a desired size which is selected by the operator.

In the embodiment, the upper limit displacement of the movement hydraulic motor 10 increases according to an increase in the acceleration operation amount, but the upper limit displacement of the movement hydraulic motor 10 may increase according to an increase in the engine rotation speed. That is, the upper limit displacement information may regulate the upper limit displacement of the movement hydraulic motor 10 with regard to the engine rotation speed.

According to the illustrated embodiment, it is possible to provide a work vehicle and a work vehicle control method where it is possible to improve movement operability.

The invention claimed is:

1. A work vehicle comprising:
   an engine;
   a hydraulic pump configured to be driven by the engine;
   a movement hydraulic motor configured to be driven by hydraulic fluid discharged from the hydraulic pump;

an acceleration operation member configured to be operated in order to set a target rotation speed for the engine;

a cut off valve configured to reduce a drive circuit pressure so that the drive circuit pressure does not exceed a predetermined cut off pressure value, the drive circuit pressure being a pressure of the hydraulic fluid supplied to the movement hydraulic motor; and a control section configured to perform traction control in which a maximum traction force is reduced by limiting a displacement of the movement hydraulic motor to an upper limit displacement which is smaller than a maximum displacement, the control section controlling a pump displacement and the drive circuit pressure based on the pump displacement and drive circuit pressure characteristics which show the relationship of the pump displacement and the drive circuit pressure and change according to an engine rotation speed, the control section storing upper limit displacement information which regulates the upper limit displacement of the movement hydraulic motor with regard to an acceleration operation amount, the control section determining the upper limit displacement of the movement hydraulic motor based on the upper limit displacement information in the traction control, the upper limit displacement information regulating the upper limit displacement of the movement hydraulic motor which is constant irrespective of the acceleration operation amount when the acceleration operation amount is smaller than a predetermined threshold, the predetermined threshold being an acceleration operation amount which corresponds to an engine rotation speed when the drive circuit pressure is constant at the cut off pressure value in the pump displacement and drive circuit pressure characteristics, the upper limit displacement information regulating the upper limit displacement of the movement hydraulic motor which increases according to an increase in the acceleration operation amount when the acceleration operation amount is the predetermined threshold or more.

2. The work vehicle according to claim 1, wherein the displacement of the movement hydraulic motor is controlled by controlling an inclination angle of the movement hydraulic motor.

3. A control method of a work vehicle including an engine, a hydraulic pump driven by the engine, a movement hydraulic motor driven by hydraulic fluid discharged from the hydraulic pump, an acceleration operation member configured to be operated in order to set a target rotation speed for the engine, and a cut off valve configured to reduce a drive circuit pressure so that the drive circuit pressure does not exceed a predetermined cut off pressure value, the drive circuit pressure being a pressure of the hydraulic fluid supplied to the movement hydraulic motor, the control method comprising:

performing traction control with a control section in which a maximum traction force is reduced by limiting a displacement of the movement hydraulic motor to an upper limit displacement which is smaller than a maximum displacement; and controlling a pump displacement and the drive circuit pressure with the control section based on the pump displacement and drive circuit pressure characteristics which show the relationship of the pump displacement and the drive circuit pressure and change according to an engine rotation speed, storing upper limit displacement information with the control section, the upper limit displacement information regulates the upper limit displacement of the movement hydraulic motor with regard to an acceleration operation amount, determining the upper limit displacement of the movement hydraulic motor with the control section based on the upper limit displacement information in the traction control, regulating the upper limit displacement of the movement hydraulic motor with the upper limit displacement information, the upper limit displacement of the movement hydraulic motor being constant irrespective of the acceleration operation amount when the acceleration operation amount is smaller than a predetermined threshold, the predetermined threshold being an acceleration operation amount which corresponds to an engine rotation speed when the drive circuit pressure is constant at the cut off pressure value in the pump displacement and drive circuit pressure characteristics, regulating the upper limit displacement of the movement hydraulic motor with the upper limit displacement information, the upper limit displacement of the movement hydraulic motor increases according to an increase in the acceleration operation amount when the acceleration operation amount is the predetermined threshold or more.

* * * * *